United States Patent Office 2,872,396
Patented Feb. 3, 1959

2,872,396
CONVERSION PROCESS

Alexander T. Wilson, Whiting, Ind., and David A. McCaulay, Chicago, Ill., assignors to Standard Oil Company, Chicago, Ill., a corporation of Indiana No Drawing. Application November 3, 1955
Serial No. 544,828

6 Claims. (Cl. 204—162)

This invention relates to the conversion of normally gaseous, or light boiling hydrocarbons, to normally liquid, higher boiling hydrocarbons. More particularly, it relates to such conversion by the reaction of paraffins with olefins.

The reaction of paraffins with olefins in conventional practice, i. e. commercial alkylation, has required the use of catalysts, specifically acid type catalysts such as sulfuric acid or hydrogen fluoride, or the use of very high temperature. In commercial practice, thermal alkylation has not proved competitive in general with catalytic alkylation. The catalytic process, however, is expensive because the catalysts are expensive, and the design and operating problems associated with handling a catalyst, mixing it with the hydrocarbon feed components and separating it from the reaction mixture are costly. As a result, catalytic alkylation has been largely limited in commercial practice to the production of super octane components for high octane aviation gasoline. Commermcial application of alkylation on a broad scale has been limited moreover by the fact that an isoparaffin is required as the feed.

The present invention arises from our discovery that the reaction of paraffins with olefins is activated by ionizing radiation of the type produced by nuclear reaction associated with nuclear fission or decomposition of nuclear fission products. According to the invention, a lower paraffin is charged to a reaction zone where it is subjected in the presence of a $C_4$ or higher olefin to ionizing radiation produced by nuclear reaction. A dense phase, advantageously a liquid phase, should be maintained in the reaction zone. The amount of radiation provided should favor the interreaction of the paraffins and olefins rather than competing side reactions leading to high boiling products. This may be readily controlled, as is well known, by regulation of the radiation flux, or the radiation dose, or both, in response to analytical determinations of the reaction products which are separated from the reaction mixture. The process provides a simple, convenient and potentially very inexpensive means for large scale conversion of light paraffins to useful liquid products boiling in the range of gasoline and jet fuel. By appropriate selection of starting materials, the products can be varied in structure and molecular weight to produce fuels of high octane value for piston type engines to low octane fuels of relatively low spontaneous ignition temperature for jet type engines. A special advantage of the process is that normal paraffins as well as isoparaffins containing a tertiary carbon atom are suitable feed stocks.

In the process of the invention, a variety of low boiling paraffins may constitute the feed stock, for example, propane, normal and isobutanes, pentanes and higher paraffins. Mixed paraffin feeds may be used including, for example, mixtures of paraffins such as are available in casinghead gasoline. Use of the butanes, however, is particularly advantageous in terms of reactivity and in up-grading a normally gaseous paraffin which is available in large quantities to a gasoline component. The olefin component may comprise a $C_4$ olefin, preferably, isobutylene or butene-2. Higher olefins, provided they do not preferentially polymerize upon exposure to ionizing radiation, may be used, but surprisingly, it has been found that the lower olefins such as ethylene and propylene are not suitable.

The reaction is conducted by passing the reactants into a reaction zone which is designed so that a radiation dose sufficient to promote alkylation can be uniformly imposed on the reaction mixture. The desirable dose is in the range of $10^6$ to $10^9$ REP (Roentgen equivalent physical). The dosage may be controlled by correlating the total flux and the radiation field imposed on the reaction zone, the holding time within the reaction zone, and the design geometry of the vessel or tube defining the reaction zone. The particular hydrocarbon reactants in the feed, the nature of the radiation particles and the source of the radiation also should be taken into account. For example, in the reaction of butanes with isobutylene, using gamma radiation from cooling uranium fuel elements, a dose between $10^9$ and $10^8$ REP appears desirable.

Radiation produced predominantly by gamma rays is advantageous in the application of the invention, but neutron and beta or electron radiation also are suitable. The radiation field may be produced in a number of ways. For example, the reactants may be flowed around a nuclear fission reactor. The design of the hydrocarbon reactor can be integrated with the design of a nuclear reactor so as to use the hydrocarbon reaction mixture as a moderator in the nuclear reactor system, or alternatively as a neutron reflector or radiation shield in a nuclear reactor system. Also, the reactants may be passed through tubes or over fabricated elements containing pile produced radioactive materials such as cobalt-60 for gamma radiation or strontium 90 for beta radiation. In the broadest application of the invention, however, it is desirable to utilize waste fission products or used fuel elements as the radiation source. For example, off gases from a water boiler type nuclear reactor can be injected into the reaction zone with the reactants. The reactants can be charged to a reactor and subjected to radiation from a fission product source including one or more cooling nuclear fuel elements or a body or stream of fission products in solution or slurry form.

Ordinarily, the radiation is conducted at ambient temperatures although reduced temperatures or somewhat elevated temperatures, in the range of about —50° to 150° C. (or more ranging up to the incipience of thermal cracking), may be used. For radiation efficiency and effective promotion of the reaction, the hydrocarbons undergoing reaction should be maintained in a dense phase. In practical operation, maintenance of a liquid phase in the reaction zone provides a dense phase of high absorptive capacity for radiation relative to volume while providing a medium facilitating handling, separation and recycle of particular components. Thus, elevated pressure sufficient to maintain a liquid phase in the reaction zone is advantageous. In closed systems, autogenous pressures may prevail.

The reaction requires at least an equal proportion of paraffin to olefin, but advantageously an excess of paraffin is used. For example, 5 or 6 moles of paraffin per mole of olefin may be charged, while an internal ratio of 100 to 200 moles of paraffin per mole of olefin may be maintained by recycle. The properties of the product may be varied by changing the olefin ratio; in general, higher ratios of olefins result in an increased production of higher boiling products.

In applying the process, a recycle type flow system is preferred in which the feed is charged to the reaction zone and the resulting reaction mixture is conducted to a separate fractionating zone. The products are withdrawn from the system and selected fractions are recycled, while any undesirable light gases may be purged. Actually, with butane, there has been a noticeable absence of light products produced by decomposition. The major products are a $C_5$ to $C_{12}$ hydrocarbon fraction, which may be separated as a side stream, and a heavier fraction suitable for jet fuel manufacture, which is recovered as bottoms.

The following examples are illustrative of the principles of the invention but are not intended to be definitive with respect to conditions or procedure.

Example I

A mixture of 70 parts of isobutane and 14 parts of isobutene was sealed in a water tight bomb under pressure establishing the liquid phase. The bomb was exposed to a radiation dose of $10^9$ REP of gamma rays from waste fission products in a canal type facility in which used fuel elements were stacked vertically under water. The fuel elements were obtained from a water cooled, enriched uranium thermal neutron reactor, the maximum flux provided in the radiation facility was $10^7$ roentgens per hour. The bomb was lowered through 18 feet of water as shielding into the water filled radiation space. After radiation to the above mentioned dosage level, the bomb was lifted from the canal, scrubbed to remove contaminants and shipped to a processing laboratory. The $C_4$'s were separated and fractionation of the resulting alkylate resulted in the following compositional analysis:

|  | Vol. ml. | Vol. Percent |
|---|---|---|
| $C_4$ | 0.6 | 2.1 |
| $C_5$ | 0.5 | 1.8 |
| $C_6$ | 1.1 | 3.9 |
| $C_7$ | 1.0 | 3.5 |
| $C_8$ | 7.0 | 24.5 |
| $C_9$ | 0.2 | 0.7 |
| $C_{10}$ | 1.8 | 6.3 |
| $C_{11}$ | 1.6 | 5.6 |
| $C_{12}$ | 2.4 | 8.4 |
| $C_{13}$ | 1.6 | 5.6 |
| $C_{14}$ | 1.2 | 4.2 |
| $C_{15}$ | 0.5 | 1.8 |
| $C_{16}$ | 0.5 | 1.8 |
| $C_{17}$ | 1.0 | 3.5 |
| Bottoms—$C_{18}$ and Higher | 7.5 | 26.3 |
|  | 28.5 | 100.0 |

Significantly, the yield of liquid products exceeds the theoretical yield obtainable by olefin polymerization, thus definitely establishing interaction of the olefin and paraffin. The high proportion of $C_8$ material produced also is noteworthy.

Example II

A mixture of 74 parts n-butane and 16 parts of isobutene were exposed to a dose of $10^8$ REP of gamma radiation in the system of Example I. The $C_4$'s were separated and were analyzed on the mass spectrometer. The olefin-paraffin ratio of the unreacted $C_4$ hydrocarbons was nearly the same as that of the feed; evidently both the olefin and paraffin participated in the reaction. About 6 parts of $C_5+$ product were formed. Fractionation showed it to have the following composition:

|  | Volume percent |
|---|---|
| $C_7$ and $C_8$ | 35 |
| $C_9$ and $C_{10}$ | 30 |
| $C_{11}$ and higher | 35 |

Example III

The nature of the above reactions was further explored by subjecting the following samples to similar irradiation of $10^8$ REP at a rate of $2\times10^6$ REP per hour: isobutene (121 grams), isobutane (93 grams), n-butane (112 grams), n-butane-propane (54–50 grams), isobutane-propane (55–52 grams), isobutane-isobutylene (84–18 grams), isobutane-butene 2 (48–48 grams), isobutane-propylene (85–15 grams), isobutane-ethylene (98–18 grams).

The simple paraffins reacted to give 2 to 4% yield of product. The product consisted mainly of dimer and trimer with a variety of isomers being formed. About 1 mole of hydrogen and from 0.1 to 0.2 mole of methane were produced per mole of paraffin entering into the reaction.

The olefin, isobutylene, gave dimer and trimer as the major reaction products. Slightly more product but considerably less non-condensables were obtained than in the irradiation of the paraffins.

The mixtures of olefins and paraffins gave 5 to 7% yield of reaction product. Except when the olefin was ethylene or propylene, both olefins and paraffins appeared to participate in the reaction. The $C_5+$ products were complex mixtures with 60 to 90% of the material boiling in the gasoline range. Much less hydrogen was formed with olefin-paraffin mixtures than with simple paraffins alone. The products of the reaction appeared quite different than the products of photochemical alkylation reactions.

In the run with ethylene and isobutane, 60% of the ethylene was converted to a high boiling liquid and a wax. Little or no isobutane took part in the reaction. In a similar run with propylene and isobutane about one third of the propylene was converted to low molecular weight polymer. Again the isobutane did not take part in the reaction.

The above olefin-paraffin reactions may be thought of as cracking reactions rather than as alkylations. Cracking in the examples would be carried out in the liquid phase and hence, recombination of the fragments could readily take place while at the same time carbon-carbon bonding would be suppressed. The presence of olefin may be beneficial in tending to decrease the chance for chain termination, thereby increasing the yield of product.

We claim:

1. A process for the conversion of light paraffins to higher boiling liquid products which comprises charging a lower paraffin of 3 to 5 carbon atoms to a reaction zone, subjecting the paraffin in the reaction zone in the presence of an olefin of 4 carbon atoms to an amount in the range of about $10^6$ to $10^9$ REP of ionizing radiation at a rate of at least $2\times10^6$ REP per hour produced by nuclear reaction favoring interreaction of the paraffin and the olefin as a predominant reaction while maintaining the reactant mixture as a dense phase in the reaction zone, and separating the resulting product from the resulting reaction mixture.

2. The process of claim 1 in which unconverted material is separated from the reaction mixture and recycled to the reaction zone.

3. The process of claim 1 in which the ionizing radiation is gamma radiation.

4. The process of claim 1 in which the paraffin feed comprises normal paraffin.

5. The process of claim 4 in which the paraffin feed comprises normal butane.

6. The process of claim 1 in which the paraffin feed comprises isobutane.

(References on following page)

References Cited in the file of this patent

UNITED STATES PATENTS 2,350,330  Remy ---------------- June 6, 1944

FOREIGN PATENTS 309,002  Great Britain ----------- Apr. 2, 1929

OTHER REFERENCES

Schoepfle et al.: "Ind. and Eng. Chem.," vol. 23, No. 12, pages 1396, 1397, December 1931.

Smyth: "A General Account of the Development of Methods of Using Atomic Energy for Military Purposes," page 16, August 1945.